UNITED STATES PATENT OFFICE.

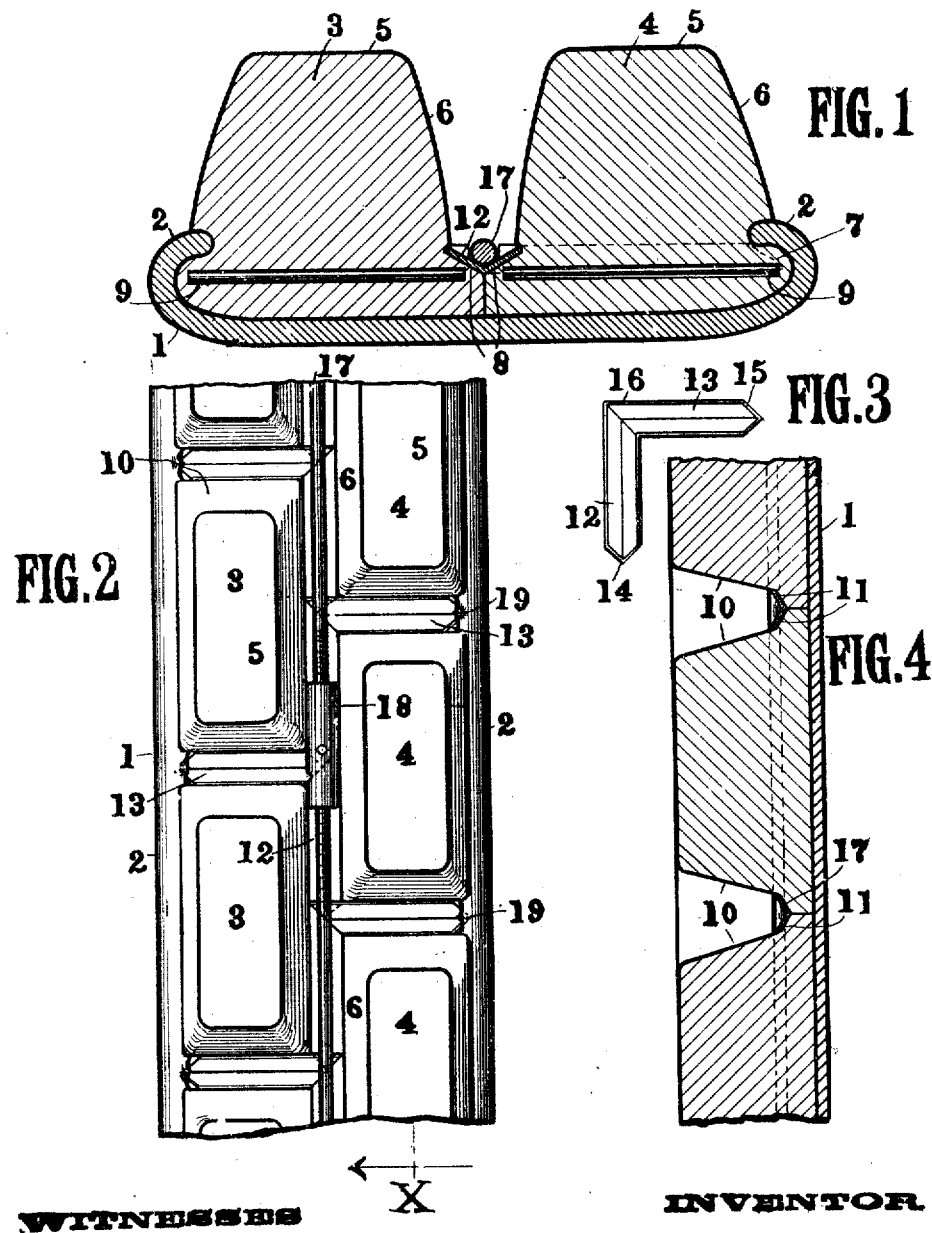

JAMES A. SWINEHART, OF AKRON, OHIO.

VEHICLE-TIRE AND FASTENING MEANS THEREFOR.

954,225.  Specification of Letters Patent.  Patented Apr. 5, 1910.

Application filed January 25, 1909. Serial No. 474,088.

*To all whom it may concern:*

Be it known that I, JAMES A. SWINEHART, a citizen of the United States, residing at Akron, in the county of Summit and State of Ohio, have invented new and useful Improvements in Vehicle-Tires and Fastening Means Therefor, of which the following is a specification.

This invention relates to improvements in resilient tires for vehicles and fastening means for holding the same on a wheel rim.

The object of this invention is to provide a tire comprising a plurality of individual blocks or bodies of resilient material arranged to be positioned in a vehicle wheel rim and held there by means which will permit the removal or replacement of an individual block without dislodging the remaining blocks comprising the tire, said blocks being arranged on the wheel rim in a plurality of longitudinally-extending series so that the joints in each series of blocks will alternate in position with respect to the joints between blocks of adjacent series.

The invention further contemplates so constructing the tire that the fastening means therefor will fixedly hold the resilient blocks thereof securely in position when desired and yet of such construction as to permit of the ready removal of individual blocks therefrom, the arrangement of the blocks being such as to increase the resiliency of the tire and traction of the same on the roadway and reduce the liability of slipping or skidding of the tire.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures: Figure 1 is a cross sectional view of a rim and tire portion of a wheel constructed in accordance with this invention, also showing in cross section a tire, together with the holdfast means for securing the same, said holdfast means arranged in operative relation therewith. Fig. 2 is a plan of a portion of a wheel rim and tire mounted therein embodying this invention. Fig. 3 is a detail of one of the holdfast devices for the tire; and, Fig. 4 is a sectional view on line X of Fig. 2.

In the drawings, the reference numeral 1 denotes the rim which is of the ordinary clencher type provided with inturned side flanges 2, and while this type of rim is used to illustrate the invention in connection with the tire to be hereinafter described, other forms of rim may be employed by varying the base portion of the tire to be seated therein.

Mounted on the rim 1 are a plurality of rubber bodies, hereinafter denominated blocks, arranged in parallel series, the blocks of one series being denominated by the reference numeral 3 and those in the other series by the reference numeral 4. These blocks are all similar and each of them consists of a tread portion 5 from which depend lateral portions 6 to a base portion having one side provided with a groove to receive one of the flanges 2 of the rim and with a portion 7 below said groove to fit under the inturned hook-shaped portion of said rim. The opposite side of each of the blocks is provided with a shoulder 8 preferably inclined at an appropriate angle, for a purpose to be later described. Embedded in each of the blocks is a transversely-extending wire or bar 9. The ends 10 of each of the blocks are preferably inclined and are provided with a transversely-extending shoulder 11, for a purpose to be later described. When each series of blocks is positioned on a wheel rim the ends of the blocks of each series are in abutting relation with each other whereby there is formed between them a transversely-extending notch, by reason of the fact that the inclined shoulders 11 of contiguous blocks are in registering relation with the portion below said shoulders abutting. The lateral portions of the base of the blocks below the shoulders 8 are also in abutting relation, as clearly shown in Fig. 1 and the transverse notches or points of union between the blocks of each series are alternately disposed with respect to the points of union or notches of the blocks of an adjacent series, as clearly shown in Fig. 2. It will be further apparent that while only two series of resilient blocks are shown on the rim 1, it will be entirely within the scope of this invention to provide a wider rim and place thereon three or more series of resilient blocks, all arranged as described with reference to each other, as the two series 3 and 4 shown and described in the drawings.

In order to hold the resilient blocks 3 and 4 in position, there is placed in the groove formed by the registering shoulders 8 of the two series of blocks a plurality of members 12 preferably of sheet metal, V-shaped in cross section with an integral laterally-extending similarly-shaped arm 13, the inclination of the portions of the members 12 and its laterally-extending arm 13 being such as to conform to and seat upon the registering shoulders 8 between the two series 3 and 4 and also to fit in the registering shoulders 11 formed in the ends of adjacent blocks in each series. The end of the member 12 is preferably chamfered or cut away at 14, as shown in Fig. 3 and the end 15 of the arm 13 is also similarly provided. The arm 13 is also provided with a groove or cut away portion 16 for a purpose to be later described.

In setting up a tire of this description, the blocks are arranged in two series, as shown in the drawings, with the joints between adjacent blocks of one series alternating in position with the joints between adjacent blocks of the proximate series. The members 12 are then forced into the groove formed between adjacent series until they rest upon the registering shoulders 8 of the members thereof with the arms 13 positioned upon the registering shoulders 11 of contiguous blocks of one series. In positioning the members 12 the end 15 of each arm 13 will be forced under one of the overhanging and inturned flanges 2 of the rim so as to lock thereunder. The second member is then placed in position with the arm 13 thereof turned in the opposite direction and in the alternating notch so that the lateral arm 13 thereof is arranged to be seated on the registering shoulders 11 of the blocks of the other series with its end locked under the opposite flange 2 of the rim. This method is continued with the arms 13 alternately in opposite directions to seat in the alternating notches between the blocks of each series. The main portions of these members 12 will be of such a length that when the lateral arms 13 are positioned on the registering shoulders 11 the chamfered or inclined ends 14 of the main portion thereof will lock under the next preceding member. When these members have been positioned as just described, a circumferentially-extending wire 17 is then seated in the V-shaped channel formed by the members 12 and is held against displacement by the inclined sides of the member 12 and also by reason of the fact that it passes through the openings or notches 16 of one of the side walls of the lateral arms 13 of each of the members 12. The wire 17 is provided with threaded ends to receive a turn-buckle 18 by which the wire is contracted, causing the same to firmly force the members 12 downwardly upon the registering shoulders 8, thereby holding the tire securely in position on the rim.

It will be noted that as the outer end of the lateral arm 13 of each of the members 12 engages under one of the lateral flanges 2 of the rim the said arms are also held in position against displacement and as the contraction of the wire 17 forces the members 12 downwardly, it also forces the lateral arms 13 downwardly into snug engagement with the transversely-extending registering shoulders 11, thus holding the blocks 3 and 4 securely against transverse or longitudinal movement in the wheel rim and also against unintentional displacement.

In order to prevent any possible movement of the arms 13 the flanges 2 are preferably indented at 19 by means of a suitable tool, either applied to the flanges previous to the seating of the tire or afterward, as preferred, but these indentations engage the V-shaped ends 15 of the arms 13, preventing any longitudinal movement thereof.

In order to repair the tire by the removal of an injured or worn block, the turn-buckle 18 is manipulated to release the tension on the wire 17 sufficiently to permit the removal of one or more of the members 12, after which the injured or worn block may be taken out and replaced by a new one, the members 12 replaced and tension restored to the wire 17 which effectually seats not only the new block but also the entire tire securely on the rim.

What I claim and desire to secure by Letters Patent, is:—

1. The combination with a wheel rim provided at each side with a lateral clencher flange, of a plurality of series of resilient blocks arranged circumferentially of and seated against said rim, the opposing ends of the blocks of each series cut-away to provide transversely extending notches, the notches between the blocks of one series being alternately disposed with respect to the blocks of an adjacent series, the oppositely disposed lateral faces of the blocks of the adjacent series provided with shoulders, the shoulders of one series abutting against the shoulders of the other series, said plurality of series of blocks constituting a tire, said clencher flanges overlapping one side of the base of said blocks, a plurality of angle-shaped retaining members for the pairs of blocks of each series, the longitudinally extending portions of said angle-shaped members seated against said shoulders and the laterally extending portions of said members seated in said transversely extending notches and having their free ends extending under the clencher flanges, and means engaging with the longitudinally extending portions of said members for locking the latter in position.

2. The combination with a wheel rim provided at each side with a lateral clencher flange, of a plurality of series of resilient blocks arranged circumferentially of and seated against said rim, the opposing ends of the blocks of each series cut-away to provide transversely extending notches, the notches between the blocks of one series being alternately disposed with respect to the blocks of an adjacent series, the oppositely disposed lateral faces of the blocks of the adjacent series provided with shoulders, the shoulders of one series abutting against the shoulders of the other series, said plurality of series of blocks constituting a tire, said clencher flanges overlapping one side of the base of said blocks, a plurality of angle-shaped retaining members for the pairs of blocks of each series, the longitudinally extending portions of said angle-shaped members seated against said shoulders and the laterally extending portions of said members seated in said transversely extending notches and having their free ends extending under the clencher flanges, and means engaging with the longitudinally extending portions of said members for locking the latter in position, the longitudinally extending portion of each of said members being V-shaped in cross-section.

3. The combination with a tire rim provided with clencher flanges, of a tire formed of a plurality of series of separate blocks of rubber seated against said rim and engaged by said flanges, angle-shaped fastening devices for said blocks, the longitudinally extending portions of said angle-shaped members positioned between the series of blocks, and the laterally extending portions of said members extending between the pairs of blocks of each series, the free ends of said laterally extending portions of said members projecting below said flanges, and circumferentially extending means engaging the longitudinally extending portions of said members for locking them in position whereby the blocks are retained against the rim.

In testimony whereof I have hereunto set my hand in presence of two subscribing witnesses.

JAMES A. SWINEHART.

Witnesses:
 GLENARA FOX,
 C. E. HUMPHREY.